United States Patent [19]

Roberts et al.

[11] Patent Number: 4,585,932

[45] Date of Patent: Apr. 29, 1986

[54] MONITOR SYSTEM FOR POTENTIALLY HAZARDOUS RADIATION AND COMBUSTION CONDITIONS

[76] Inventors: Thomas G. Roberts, 2815 Bentley St., Huntsville, Ala. 35801; Thomas E. Honeycutt, Rte. 1, Box 405, Shag Bark Trail, Somerville, both of Ala. 35670

[21] Appl. No.: 638,143

[22] Filed: Aug. 6, 1984

[51] Int. Cl.⁴ ............................................. H01J 47/02
[52] U.S. Cl. ..................................... 250/380; 250/379
[58] Field of Search ....................... 250/376, 379, 380; 374/38, 32, 31

[56] References Cited

U.S. PATENT DOCUMENTS

| | | | |
|---|---|---|---|
| 2,885,555 | 5/1959 | Blumer | 250/379 |
| 3,436,542 | 4/1969 | Ganouna-Cohen | 250/376 |
| 4,398,836 | 8/1983 | Sitek | 374/38 |
| 4,445,037 | 4/1984 | Anderson | 250/379 |

FOREIGN PATENT DOCUMENTS 1193617  5/1965  Fed. Rep. of Germany ...... 250/376

Primary Examiner—Alfred E. Smith
Assistant Examiner—Richard Hanig
Attorney, Agent, or Firm—Anthony T. Lane; Robert P. Gibson; Freddie M. Bush

[57] ABSTRACT

A system for monitoring potentially hazardous conditions in an area. The monitor system provides a continuous check of the atmosphere in a given area for nuclear radiation hazard and for combustion hazard. When a predetermined radiation level or combustion condition occurs in the area an alarm is activated which indicates the particular kind of danger existing. A small bomb calorimeter housing or vessel supports and houses a radiation sensor and a combustion sensor. Detection circuitry responds to the radiation and combustion sensors to provide an output signal when a predetermined, dangerous threshold condition exists in the area. A screen capacitor, electroscope, and a periodic charging circuit comprise the radiation hazard detection circuitry. A reflex surge generator comprised of a sparking circuit and a spark gap in conjunction with a resistance thermometer detector provide the fire hazard circuitry. Indicator or annunciator circuitry coupled to the detectors disclose the status of the two circuits. A percentage of prevailing atmosphere is controllably forced through a portion of the container and continuously sampled to indicate potential fire and nuclear hazards.

9 Claims, 5 Drawing Figures

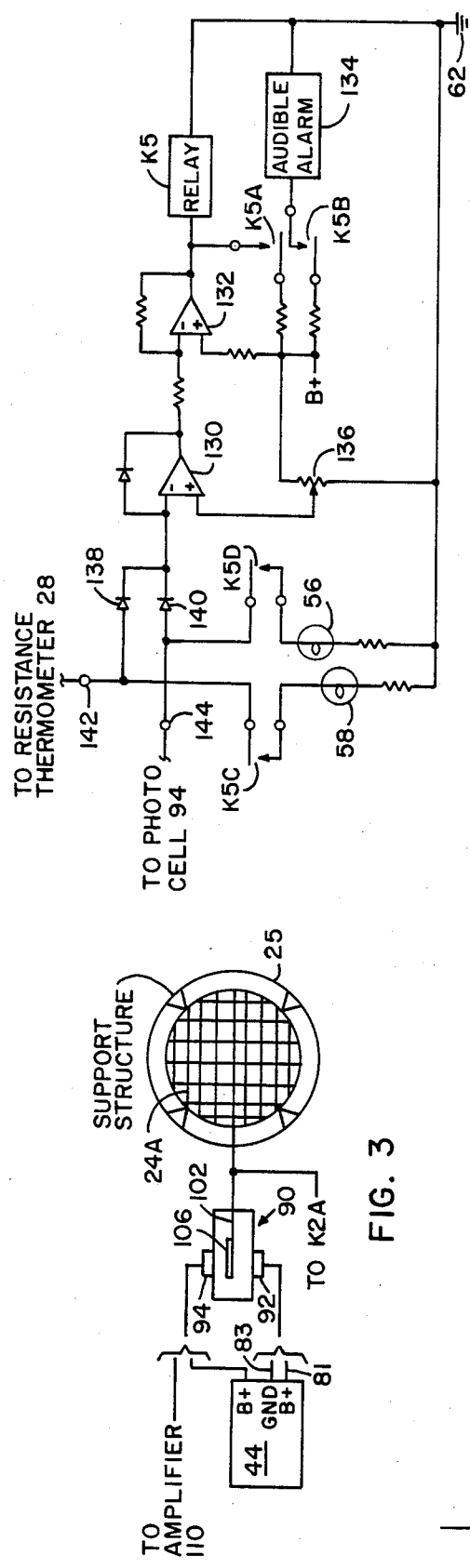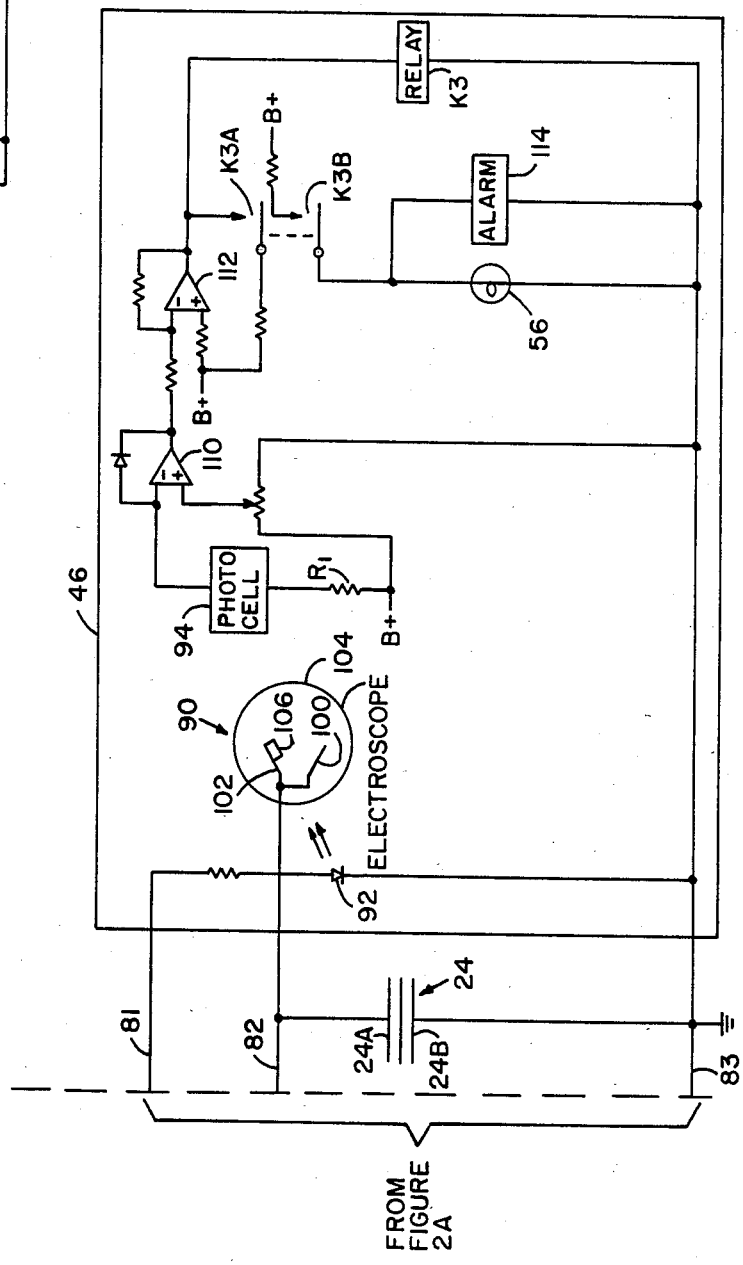

MONITOR SYSTEM FOR POTENTIALLY HAZARDOUS RADIATION AND COMBUSTION CONDITIONS

DEDICATORY CLAUSE

The invention described herein may be manufactured, used, and licensed by or for the Government for governmental purposes without the payment to us of any royalties thereon.

SUMMARY OF THE INVENTION

A system for monitoring conditions in potentially hazardous areas. The monitor system provides a continuous check of the atmosphere in a given area for nuclear radiation hazard and for combustion hazard. When a predetermined radiation level or combustion condition occurs or is exceeded in the area an alarm is activated which indicates the particular kind of danger existing. A small bomb calorimeter supports and houses the radiation sensor and combustion sensor of the system in such a manner that operation of the system does not itself pose a threat when hazardous conditions do develop or exist. Detection circuitry responds to the radiation sensor and combustion sensor outputs to provide an output annunciation when a predetermined, dangerous threshold condition exists in the area.

BRIEF DESCRIPTION OF THE DRAWINGS

FIGS. 2A and 2B are a schematic diagram of a preferred embodiment of the monitor system.

FIG. 3 is a diagrammatic drawing of the radiation sensor support structure coupled to the electroscope of the radiation detection circuit for controlling the trigger signal therefrom.

FIG. 4 is a schematic diagram of a combined radiation detection and an explosive atmosphere detection circuit for providing common annunciation circuitry.

DESCRIPTION OF THE PREFERRED EMBODIMENT

Figure 1:
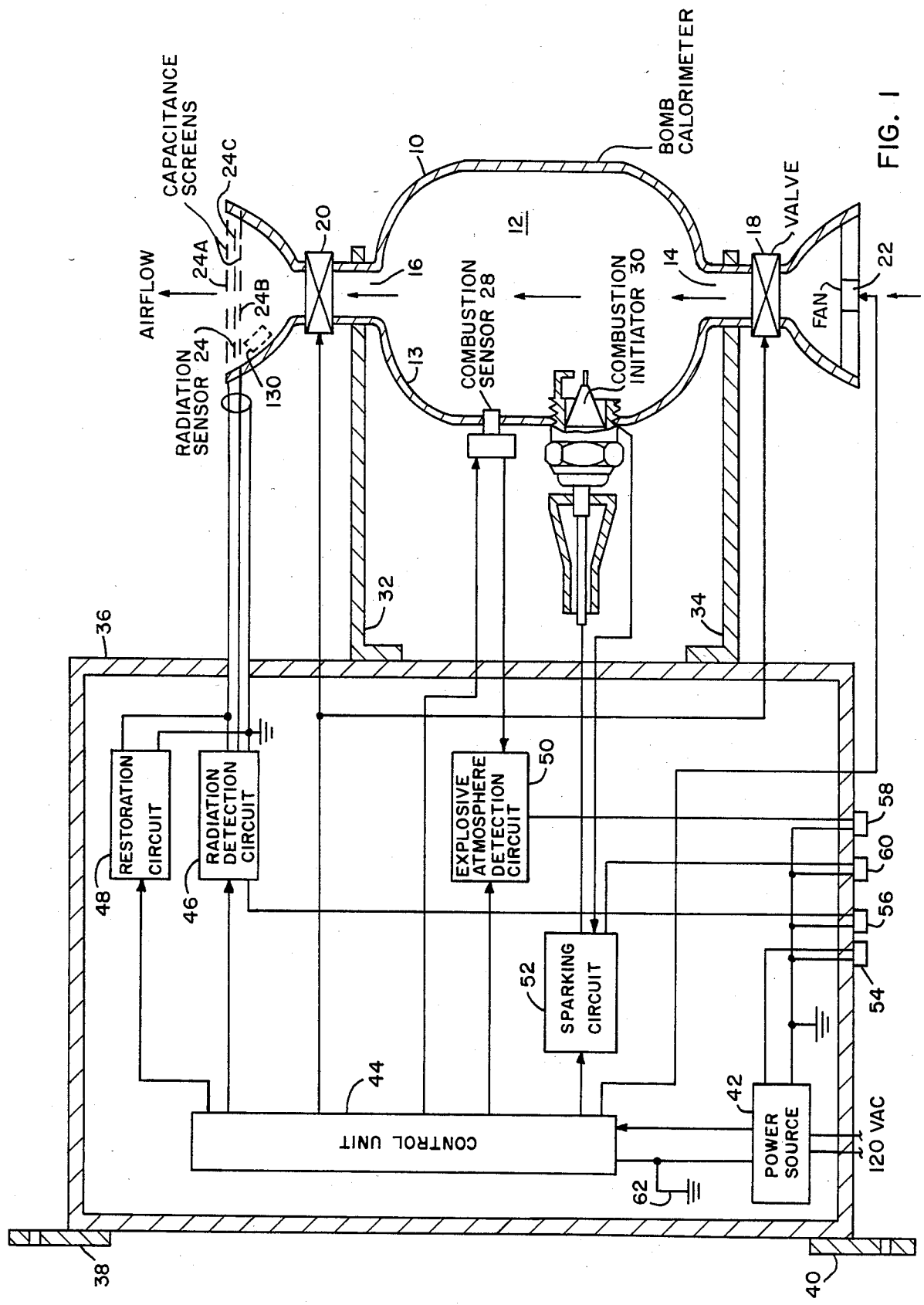
FIG. 1 is a partial block diagram - partial schematic diagram of a preferred embodiment of the invention packaged in an atmospherically controlled housing assembly and wherein in extraneous circuit components are omitted.

Referring now to the drawings wherein like numbers represent like parts, a monitor system for hazardous radiation and combustion conditions is shown in FIG. 1. In the monitor system, a small bomb calorimeter housing or vessel 10 is shown in cross section to have a chamber portion 12 through which air flow is directed from an inlet port 14 to an outlet port 16 for controllably changing the air or atmosphere within chamber 12. Power controlled valves 18 and 20 are operated electronically to mechanically open the respective inlet ports 14 and 16 simultaneously. The ports are closed mechanically, as by spring action, by removal of electrical power when closing is desired so that when the valves are closed chamber 12 is a sealed chamber. An electrically powered fan 22, positioned adjacent valve 18 and mounted on the calorimeter housing external of the chamber 12, is electrically controlled to force air or atmosphere through chamber 12 when valves 18 and 20 are open. A radiation sensor 24 is comprised of capacitance screens 24A, 24B and 24C which provide a series arranged capacitor array in the exit port 16 of calorimeter 10 so that air flow that passes through chamber 12 and valve 20 must also pass through radiation sensor 24. At least two capacitance screens (24A and 24B) are required and provide at least a single capacitor, while several capacitance screens may be used across the path of air flow. Within chamber 12 a combustion sensor 28 and combustion initiator 30 are mounted adjacent one another on the wall 13 of the housing so that atmosphere or air flow that passes through the chamber passes first to the combustion initiator and then to the combustion sensor before exiting the chamber. However, the physical location of sensor 28 and initiator 30 are not critical for proper operation of the system. Bomb calorimeter 10 and the components supported thereon and therein ar held by support arms 32 and 34 which may either be a part of or themselves fixed to a housing 36 which supports and encloses the remainder of the electrical circuitry of the monitor system. Typically, mounting brackets 38 and 40 are shown for mounting the assembly on a wall, ceiling, table, within air ducts, or in other selectable places within an area where monitoring is desired.

Within housing 36 a power source 42 provides power for driving the respective components, a control unit 44 selectively distributes the required power to the various circuits. Power is supplied from the control unit to a radiation detection circuit 46, a restoration circuit 48, an explosive atmosphere detection circuit 50, a sparking circuit 52, power valves 18 and 20, fan 22, and sensor 28. Annunciation and indicator circuits are shown generally by a power-on light 54 which is coupled to the power source 42, an excessive radiation presence light 56 which is coupled to radiation detection circuit 46, an explosive atmosphere presence light 58 which is coupled to explosive atmosphere detection circuit 50, and a spark presence light 60 which is coupled to the combustion initiator 30. Power source 42 is externally connected to a 120 volt ac power source. A system ground 62 is shown coupled to one output lead from the power source 42 to control unit 44 and is shown without being numbered at selective points in the circuit, not to be considered all inclusive but merely indicative, since such ground circuit connections are routine and well established in the state of the art.

Figure 2A:
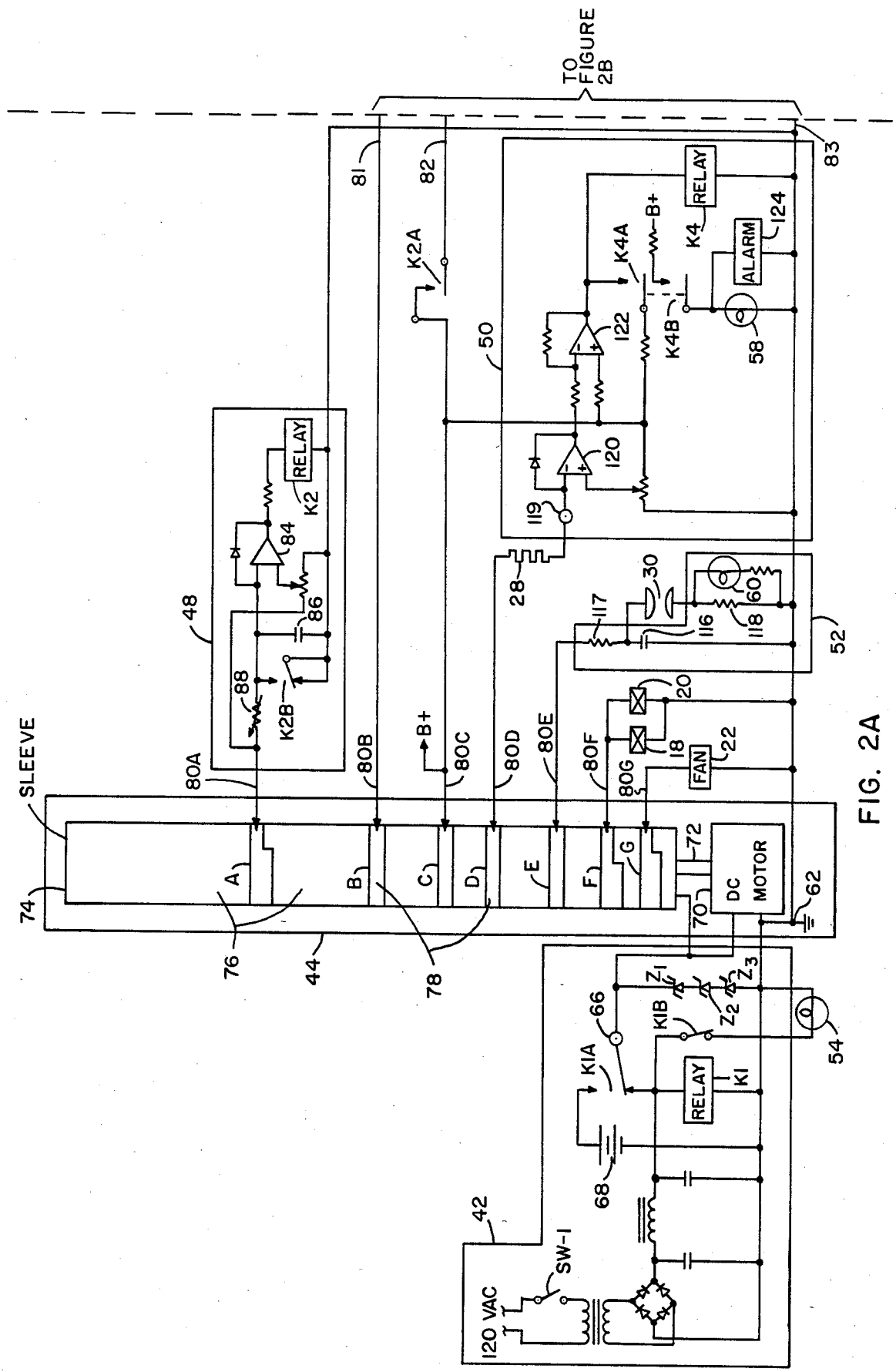

In the schematic of FIGS. 2A and 2B power source 42 is shown to have a switch SW1 for connecting the power source with a 120 volts ac supply, the input voltage being connected to a step-down transformer. Typically, the output of the step-down transformer is rectified in a bridge rectifier circuit and then passed through a capacitor-inductor filter circuit for providing the required direct voltage level necessary for operation of the system circuits. This voltage level is impressed across relay K1 which closes contacts K1A to provide the required voltage to control unit 44 by way of output terminal 66 and system ground 62, ground 62 being coupled throughout the system. Another relay contact K1B supplies power to power-on lamp 54 indicating that the circuit is operational. Contacts K1A and K1B are shown in the activated or closed condition. A series array of zener diodes Z1, Z2 and Z3 are disposed between terminal 66 and system ground and prevent excessive voltage surges in the power system from affecting the monitor circuitry. An auxillary power supply in the form of battery 68 is connected between ground and the normally closed contact K1A of relay K1 so that when a power failure occurs in the alternating current system and the relay de-energizes, the return of contact K1A to the normally closed position allows battery power to be coupled to terminal 66 for maintaining operation of the system.

The output from power source 42 is coupled directly to the control unit 44. Control unit 44 is shown typically and may actually be any one of various mechanical or electrical control units for providing various voltage levels or periodic levels as output. The system ground and output from terminal 66 are coupled to a dc drive motor 70 within control unit 44 which turns a shaft 72 at a continuous steady rate. Shaft 72 supports a hollow, cylindrical sleeve 74 that is fixed to and rotates with the shaft. Sleeve 74 is formed alternately of non-conductive cylindrical portions 76 and conductive portions 78. Another output from terminal 66 of power source 42 is coupled into the hollow inner region of sleeve 74 (not shown) for providing a plurality of slidably disposed, pressure type contacts which engage the conductive bands 78 during at least a portion of each 360° rotation of the sleeve, providing direct current power to the system components during the period that contact with the conductive portions 78 occurs. Sliding contacts 80 on the surface of bands 78 provide electrical connection to the other system components. Control unit 44 is typical of mechanical rotating switches which makes breaker contacts as required by using bands of varying widths or partial bands and sliding contacts. Obviously more sophisticated solid state electronics may also be used as a control unit in lieu of this or other mechanical rotating switchs.

The voltage output from the voltage distribution control unit sleeve 74 is taken from the outer cylindrical surface of the conductive strips 78A-G. Sliding contacts or taps 80A-G coincide with respective conductive members 78A-G. As shown, conductive member 80A is coupled to restoration circuit 48, 80B is coupled to radiation detection circuit 46 by way of conductor 81, and 80C is coupled to provide B+ voltage to the various circuits as will be more fully disclosed hereinbelow.

Wiper 80D is connected through combustion sensor 28 to an input terminal 119 of explosive atmosphere detection circuit 50. Wiper contact 80E is coupled to sparking circuit 52 for driving the combustion initiator or spark gap 30. Wiper contact 80F is coupled to drive valves 18 and 20 in parallel, the other side of the valves being coupled directly to system ground. Wiper contact 80G is coupled to drive the motor of fan 22, the other side of fan 22 being coupled to system ground.

Typically, restoration circuit 48 comprises an operational amplifier 84 driven by a charging capacitor 86 to provide a periodic output to a relay, K2. Operational amplifier 84 has one input coupled to an adjustable bias voltage level and the other input coupled through capacitor 86 to ground, capacitor 86 and operational amplifier 84 are both coupled through a variable potentiometer 88 to wiper arm 80A and function as a timing circuit. Potentiometer 88 controls the charge time of the capacitor. When the capacitor charge voltage reaches a predetermined level, the output voltage from the operational amplifier activates relay K2. Relay K2 activates two contacts momentarily. Contact K2A is coupled to B+ supplied from wiper arm 80C and, when activated, momentarily provides the B+ by way of conductor 82 to the parallel combination of radiation sensor 24 and to radiation detection circuit 46. Relay contact K2B operates to short circuit capacitor 86 reducing the charge of capacitor 86 and allowing the output of amplifier 84 to drop below a level that will sustain activation of K2, thereby allowing K2 to drop out after momentarily applying the charging voltage across radiation sensor 24.

Radiation detection circuit 46 is primarily comprised of electroscope 90, a light emitting diode 92 and a cadmium sulfide photo conductive cell 94 which provide radiation sensing and output circuit triggering. A series coupled operational amplifier arrangement coupled to photo cell 94 drives relay K3 to provide circuit annunciation.

Traditionally, electroscope 90 includes a pair of movable arms 100 and 102 within a housing 104. Arms 100 and 102 are electrically coupled together at one end within the chamber and are movable in a plane with respect to one another in response to a voltage difference impressed on the respective leads coupled thereto. In their simpliest form electroscopes respond to direct current voltage by movement of arms 100 and 102 closer together or farther apart according to the electric charge thereon which makes the arms or leaves repel each other. Atmospheric conditions can cause a gradual decay of the electric charge or potential difference between the arms or leaves in the absence of further stimulation, causing the leaves to come together.

In electroscope 90, arm or leaf 102 has a protruding member 106 thereon projecting toward arm 100. Physically, electroscope 90 is disposed between diode 92 and detector cell 94 for blocking a light path between diode 92 and detector 94 when the capacitance screens of radiation sensor 24 are excessively discharged.

The series coupled operational amplifier circuits 110 and 112 each have an input coupled to B+ for providing bias voltage thereto. Another input of amplifier 110 is coupled to one side of detector 94, the output of amplifier 110 is coupled as an input to amplifier 112, and the output of amplifier 112 is coupled through a relay K3 to system ground by way of lead 83. A second lead of detector 94 is coupled through a resistance to B+. Contact K3A of relay K3 is coupled on one side to the output of amplifier 112 and on the other side to B+ for providing a latching voltage across relay K3 after the relay is initially energized by the output of amplifier 112. Contact K3B is coupled between B+ and a parallel connected lamp 56 and alarm circuit 114 which, after activation, provide visible and audible alarms continuously until the detected radiation hazard is removed and the system is reset.

Sparking circuit 52 comprises a capacitor 116 and a resistor 117 connected in series with wiper blade 80E. Combustion initiator 30 is coupled in parallel with the capacitor 116. Coupled between a lead of combustion initiator 30 and system ground is a parallel connected discharge resistance 118 and lamp 60. This arrangement allows a trickle current to pass through the lamp periodically, when the combustion initiator sparks, providing a flashing indication of operation of the system. Capacitor 116 and initiator 30 function as a reflex surge generator. During normal atmospheric conditions combustion sensor 28 maintains an equilibrium temperature produced by the small amount of heat liberated by the combustion initiator 30. However, when excessive combustible materials are present in the atmosphere, combustion initation within the calorimeter housing or vessel causes a chemical reaction to occur therein. Heat released by the chemical reaction causes a change in temperature within the calorimeter which produces voltage changes in sensor 28 that initiates an alarm from explosive or combustible atmosphere detection circuit 50.

Detection circuit 50 is substantially identical to the alarm circuit of radiation detection circuit 46 having operational amplifiers 120 and 122 coupled in series from input terminal 82 through a relay K4 for activating an audible alarm 124 and visual indication light 58.

FIG. 3 discloses a diagrammatic view of the physical arrangement between electroscope 90, diode 92, and detector 94 with pertinent electrically interconnected circuitry shown in perspective. Therefore, arm 100 is not shown. Control unit 44 supplies the input voltage and system ground to LED 92 and B+ to one side of detector cell 94 while the other side of detector cell 94 is coupled to amplifier 110. Protruding member 106 of blade 102 is disposed projecting across the optical line of sight between LED 92 and detector 94 so that when the electroscope is activated or energized, blade 102 and member 106 are raised so that light passes from diode 92 to detector 94 to maintain relay K3 in a off condition. However, rapid discharge of radiation sensor 24 causes the blades to come substantially together so that member 106 blocks the light passing from 92 to 94. This changes the status of amplifiers 110 and 112, activating relay K3 and the alarm system. Typical of capacitance screens, screen 24A is a fragile screen or wire mess held substantially in a plane by support structure 25, with support structure 25 providing the structural support for attaching screen 24A in the exhaust port of calorimeter 10.

In operation, the control unit 44 is energized and shaft 72 starts to rotate sleeve 74. Conductive bands 78A-G may supply voltage either all or part of the time of each revolution depending on the needs of the particular circuit and the mode of operation desired. Typically, bands 78B-E receive and disperse input voltage at all times to the respective circuits 46, B+, 28, 50, and 52. Band 78A is shown as providing voltage to restoration circuit 48 only during part of the revolution of the shaft. Obviously this may be varied depending on the time rate of charge desired for capacitor 86 to provide the periodic voltage pulses to electroscope 90. Otherwise a gradual discharge occurs naturally through the atmosphere between screens 24, allowing the electroscope contacts to come together. Thus, contact 78A may be used in conjunction with potentiometer 88 to control the timing rate of capacitor 86. Contacts 78F and G of cylinder 74 are appropriately cut or arranged so that fan motor 22 is energized at the same time that valves 18 and 20 are open to control air flow through chamber 12. When power is removed from 78F, the valves automatically return to the closed position. When the control unit 44 is energized monitors 46 and 50 are also activated and their alarms are set. When valves 18 and 20 are closed the fan is de-energized, the sparking circuit is energized, and the combustion initiator 30 is sparked. The valves 18 and 20 are then opened and fan 22 is energized and replaces the air within chamber 12 with new air. The process is continuously repeated. When there are no combustible materials present in the atmosphere or air being sampled nothing happens in the bomb calorimeter and the temperature of the combustion sensor is at an equilibrium temperature produced by the small amount of heat liberated by the combustion initiator and normal heat losses including convection produced by the flow. However when potentially dangerous conditions occur the combustion initiator causes a chemical reaction to occur within the bomb calorimeter and the heat released by the chemical reactions causes a large change in temperature which produces a voltage change in the combustion sensor that initiates the alarm. As air exiting the chamber 12 passes through the hazardous radiation sensor 24, radioactive material (if present) will cause ionization in the air which causes sensor 24 to discharge much more rapidly than normal. The consequent voltage drop across the sensor screens is used to initiate the hazardous radiation alarm. Detection of radiation or an explosive atmosphere causes the respective alarm relays to pick up and lock in, providing a visible and or audible alarm until the cause of the alarm is removed and the system is reset.

Obviously the lights and audible alarm are not necessary for operation of the system as other annunciation means may be provided, however similar annunciation circuits may be used to send signals to some central safety control unit when elaborate safety procedures are in order.

The screen wire capacitor type sensor mounted in the exit port of the calorimeter can also be mounted in the entrance port to avoid any residual ionization from the combustion initiator. However, such ionization should be gone due to recombination before it reaches the radiation sensor.

Radiation sensor 24 does not have to be of the capacitor type. For example, a battery type detector such as that disclosed in U.S. Pat. No. 3,585,389 entitled "Simple Solid Electrolyte Gamma-Ray and Relativistic-Charged Particle Dosimeter" issued to T. G. Roberts, one of the joint inventors of the instant invention, may be used. This battery type detector can be mounted in or on the wall of the exit port such as shown typically by the dashed box 130 in exit port 16 of FIG. 1 and simply replaces the capacitor detector in the circuit. Where the battery detector 130 is used, restoration circuit 48 is no longer required and the battery detector 130 can be periodically replaced to maintain proper electroscope operation. The combustion sensor is shown as a resistance thermometer, however any temperature measuring system could be used.

The combustion initiator circuit 30 shown in FIG. 1 is a simple spark plug such as an automobile spark plug and sparking thereof is similar to that found in automobiles. It may be like that shown in U.S. Pat. No. 3,356,897, entitled "Arc Plasma Generator With Starter", issued to T. A. Barr. Jr. et al, T. G. Roberts being one of the coinventors. Similarly, the initiation circuit may be similar to the newer electronic ignition systems found in automobiles today. The control unit 44, set forth herein as a simple mechanical rotating switch which makes contacts as required using bands or partial bands and sliding contacts, is well established in the art. The control unit can also be comprised of modern day solid state electronics depending on the sophistication of the system desired and economic factors that are related.

FIGS. 1, 2A, and 2B show detection and annunciation circuits substantially integrated. For example, detection circuit 46 include both the detection circuitry of LED 92, electroscope 90, and photocell 94; the output signal processing of the operational amplifiers; and the alarm annunciation circuitry of relay K2, light 56, and bell 114. Similarly, detection circuit 50 includes the operational amplifier signal processing and the alarm annunciation circuitry. An alternative embodiment for this portion of the circuit is shown in FIG. 4 wherein the signal processing is the same as that for circuit 46 and 50.

In FIG. 4, operational amplifiers 130 and 132 are coupled in series through a relay K5 to system ground. Relay K5 has a latching contact K5A, which locks-in the relay once it is energized, and a contact K5B for activating an audible alarm 134 in the same manner as described for circuits 46 and 50. Bias is supplied to one terminal of amplifier 130 through potentiometer 136. The other input terminal of the amplifier is connected to the cathodes of two diodes 138 and 140. The anode of diode 138 is coupled to an input terminal 142. Terminal 142 is further coupled in series through normally opened contact K5C of relay K5 and explosive atmosphere lamp 58 to ground. Similarly, the anode of diode 140 is coupled to an input terminal 144. Terminal 144 is further coupled in series through a normally opened contact K5D of relay K5 and radiation lamp 56 to ground. Use of this circuit arrangement eliminates the duplication of circuitry in circuits 46 and 50 and simplifies system operation while circuit operation is substantially unchanged. Thus, by coupling resistance thermometer 28 to terminal 142 instead of terminal 119 (FIG. 2A), the audible alarm is latched just as before but the lamp 58 is activated by the voltage from thermmeter 28. Similarly, by coupling the output of photocell 94 to terminal 144 instead of to the operational amplifier (110 of FIG. 2B), the audible alarm is latched as before and lamp 56 is latched to the signal from the photocell. The other circuit operation is the same.

Although the present invention has been described with reference to a preferred embodiment, workers skilled in the art will recognize that changes may be made in the form and detail without departing from the scope and spirit of forgoing disclosure. Accordingly, the scope of the invention should be limited only by the claims appended hereto.

We claim:

1. A hazardous condition monitoring system comprising: a vessel having a chamber, an input port, and an output port therein for passing atmosphere along a flow path through the chamber, a radiation sensor mounted in one of said ports and disposed in the flow path through said vessel for sensing changes in atmospheric conditions in the chamber, and for providing electrical output signals therefrom; said radiation sensor having a common electrical input-output path, and being responsive to impinging energetic nuclear particles of radiation in the atmosphere passed through said vessel to provide a changed electrical output potential therefrom; annunciation means; detection means coupled to said radiation sensor for detecting a predetermined change in said electrical output potential, said detection means being coupled to provide an output to said annunciation means, said annunciation means being coupled to receive said detection means output and providing annunciation indicative of presence of excessive nuclear radiation passing through said vessel when a predetermined threshold is exceeded, said threshold being indicative of the occurance of a hazardous condition; first and second valves disposed respectively in said input and output ports for opening and closing both ports to periodically seal said chamber from external atmospheric conditions, and control means for simultaneously operating said valves.

2. A hazardous condition monitoring system as set forth in claim 1 wherein said radiation sensor is a series coupled screen capacitor array having first and second terminals for providing said input-output path, and further comprising restoration means coupled to said input-output path for periodically applying a restoring potential to said radiation sensor.

3. A hazardous condition monitoring system as set forth in claim 2 wherein said restoration means comprises a timing circuit coupled for periodically supplying a recharging voltage to said capacitor array.

4. A hazardous condition monitoring system as set forth in claim 1 wherein said detection means comprises an electroscope, a light emission source, and a light detection cell; said electroscope being electrically coupled to said radiation sensor and being physically disposed between said light emission source and said detection cell for preventing emitted light from passing therethrough in response to excessive impinged energetic nuclear particles of radiation in the prevailing atmosphere passing through said vessel.

5. A hazardous condition monitoring system as set forth in claim 4 wherein said radiation sensor is a series coupled screen capacitor having first and second leads for providing said input-output path, said electroscope being electrically coupled to said first lead of said capacitor, said second lead of the capacitor being coupled to system ground, said screen capacitor being disposed across the atmospheric flow path through the vessel for discharging stored electrical output potential in response to said impinging radiation.

6. A hazardous condition monitoring system as set forth in claim 5 and further comprising a combustion initiator mounted on said vessel for initiating combustion within said chamber, and sparking means external to said chamber and coupled to said initiator for periodically applying a voltage to said initiator for stimulating an electrical arc within said chamber; and wherein said sensing means further comprises a combustion sensor for sensing prevailing temperature within said chamber and providing an electrical signal indicative thereof external of the chamber, said combustion sensor being coupled to provide an output to said annunciation means, said annunciation means being coupled to receive said combustion sensor electrical signal for annunciating when said electrical signal exceeds a predetermined threshold indicative of excessive heat of combusiton within said chamber.

7. A hazardous condition monitoring system as set forth in claim 6 wherein said combustion initiator is a spark gap, and said combustion sensor is a resistance thermometer.

8. A hazardous condition monitoring system as set forth in claim 7 wherein said vessel is a bomb calorimeter, wherein said first and second ports are coaxial for allowing prevailing atmosphere to be moved substantially axially through the calorimeter when said ports are opened, and wherein said valves are activated to maintain said ports in a closed condition when combustion is initiated by said combustion initiator.

9. A hazardous condition monitoring system as set forth in claim 8 wherein said electroscope comprises first and second conductive leaves lying in a common plane within a sealed chamber, a conductive lead coupled to first ends of said leaves and coupled externally of the chamber for electrically connecting said leaves to said capacitor, said first ends of said leaves being coupled together for allowing pivoted leaf movement in response to electromagnetic stimulation, second ends of said leaves being disposed for said movement in opposite directions in a common plane, and an opaque member attached to said first leaf and projecting toward said second leaf for preventing light from passing therethrough when said leaves are in juxtaposition, when said leaves are juxtaposed said opaque member being disposed in the light path between said light emission source and said detection cell for preventing emitted light from passing therethrough.

* * * * *